United States Patent [19]

Probstein et al.

[11] Patent Number: 5,074,986
[45] Date of Patent: Dec. 24, 1991

[54] ELECTROOSMOSIS TECHNIQUES FOR REMOVING MATERIALS FROM SOIL

[75] Inventors: Ronald F. Probstein, Brookline; Patricia C. Renaud; Andrew P. Shapiro, both of Cambridge, all of Mass.

[73] Assignee: Massachusetts Institute of Technology, Cambridge, Mass.

[21] Appl. No.: 362,269

[22] Filed: Jun. 6, 1989

[51] Int. Cl.$^5$ .............................................. C25C 1/22
[52] U.S. Cl. .................................. 204/130; 204/182.2; 204/180.1
[58] Field of Search .................. 204/130, 180.1, 182.2; 166/248

[56] References Cited

U.S. PATENT DOCUMENTS

| | | | |
|---|---|---|---|
| 3,417,823 | 12/1968 | Faris | 204/182.2 |
| 4,305,800 | 12/1981 | Christenson | 204/182.2 |
| 4,367,132 | 1/1983 | Bell et al. | 204/180 R |
| 4,382,341 | 5/1983 | Bell et al. | 34/1 |
| 4,479,857 | 10/1984 | Barton, Jr. | 204/130 |

FOREIGN PATENT DOCUMENTS 0865225 9/1981 U.S.S.R. ........................... 204/182.2

OTHER PUBLICATIONS

Mitchell, Potential Uses of Electrokinetics for Hazardous Waste Site Remediation, presented at Workshop on Electro-Kinetic Treatment and its Application in Environmental-Geotechnical Engineering for Hazardous Waste Site Remediation (University of Washington, Seattle, Wash.), Aug. 4-5, 1986.
Greg A. Putnam, Thesis: Determination of pH Gradients in the Electrochemical Processing of Kaolinite, Dec. 1988, pp. 35-78 and 101-110.
Renaud, Patricia C. and Ronald F. Probstein, "Electroosmotic Control of Hazardous Wastes", *PCH PhysicoChemical Hydrodynamics*, vol. 9, No. $\frac{1}{2}$, pp. 345-360, 1987.
Hammett, R., "A Study of the Processes Involved in the Electro-Reclamation of Contaminated Soils", (Thesis) University of Manchester, England, Oct. 1980.
"Workshop on Electro-Kinetic Treatment and Its Application in Environmental-Geotechnical Engineering for Hazardous Waste Site Remediation", Unpublished Proceedings, hosted by the University of Washington Dept. of Civil Engineering, Aug. 4-5, 1986.

*Primary Examiner*—John Niebling
*Assistant Examiner*—Arun S. Phasge
*Attorney, Agent, or Firm*—Robert F. O'Connell

[57] ABSTRACT

A method for removing contaminant material from a soil site in which one or more porous source electrodes and one or more porous sink electrodes are positioned within the soil site and voltage gradients are established among the electrodes. A purging liquid is supplied to the source electrodes so as to flow therefrom into the soil site, the voltage gradients causing the purging liquid to move by electroosmosis through the soil site toward the sink electrodes. The purging liquid displaces the contaminant material so as to cause the contaminant material to be moved from the soil site into the sink electrodes from which they can be removed, as by a pumping or siphoning action.

14 Claims, 3 Drawing Sheets

5,074,986

ELECTROOSMOSIS TECHNIQUES FOR REMOVING MATERIALS FROM SOIL

The Government has rights in this invention pursuant to grant Number CR813481-01-0 awarded by the Environmental Protection Agency.

INTRODUCTION

This invention relates generally to the removal of contaminants from hazardous waste sites and, more particularly, to the use of electroosmosis techniques for such purpose.

BACKGROUND OF THE INVENTION

Many different techniques have been proposed over the years for removing contaminants from hazardous waste sites, such as contaminated soil, all of which have suffered from one or more disadvantages which have made their use either technically or economically impractical. As used herein, soil can generally be understood to mean an earth-like medium having porosities ranging from a very densely packed clay medium to a relatively loosely packed medium, such as loosely packed sand.

The excavation and subsequent treatment of contaminated soil, for example, by soil washing or incineration, is a costly technique and may expose workers using such process to health risks. Moreover, in the case of soil washing, the procedure may not extract all of the contaminants attached to the clay or silt components of the soil, while in the case of incineration, a site pollution problem may be replaced by the creation of an air pollution problem.

In situ collection and injection remediation techniques have also been proposed. Collection techniques, such as the collection of a contaminant plume by pumping and/or drains, often suffer from dilution by surrounding ground water during collection, thus increasing the pumping and treatment costs. Further, effective control of the direction of the flow is generally not possible due to soil heterogeneity and cracks. Injection techniques, such as by using chemicals or biological agents injected in situ into the soil to detoxify the wastes, suffer from the difficulty of achieving a uniform distribution of the detoxifying materials throughout the soil. Moreover, both collection and injection techniques based on the use of pressure driven liquid flows may be impossible to use in soils having low hydraulic permeability so that their use is generally limited to relatively high permeability soils, e.g., relatively sandy soils. Moreover, when using presently proposed in situ remediation methods, including high pressure soil flushing, vacuum or steam extraction, or radio frequency volatilization, many contaminant materials, and particularly heavy metals, cannot be removed because of the strong attachment forces which bind the metals to the soil particles.

Electroosmosis has been proposed for the dewatering and consolidation of clays or other soils to provide soil stabilization, such as for construction purposes. As used herein, electroosmosis is defined as the process of moving a liquid through a porous material by the application of an electric field. In accordance therewith voltage gradients are established in the soil and the water therein is thereby caused to migrate toward and accumulate at or near one of the electrodes which are used to create the electric field therein, the accumulated water therein being removed therefrom, as by pumping.

However, efforts to apply electrokinetics in general, and electroosmosis techniques in particular, to the removal of contaminants from a waste site, are relatively recent. The movement of metal ions in fully dissociated salts within samples of saturated sands and soils have been studied by Hammett in "A Study of the Processes Involved in the Electro-Reclamation of Contaminated Soils," R. Hammett, M. Sc. Thesis in Pollution and Environmental Control, Manchester University, Manchester, ENGLAND, October, 1980. For his particular conditions, the waste movement appeared to be governed primarily by ionic migration and not by electroosmosis. Limited studies of the use of electroosmosis in clay saturated with an organic acid contaminant have also been made by Renaud and Probstein in Renaud, P. C. and Probstein, R. F. "Electroosmotic Control of Hazardous Wastes" *Physicol Chemical Hydrodynamics* Vol. 9, No. $\frac{1}{2}$, pp. 345–360, 1987. The studies show that electroosmosis techniques might be useful in hazardous waste sites, particulary where it is necessary to control the direction of flow and where the site has relatively low hydraulic permeability where hydraulic removal techniques become ineffective. While electroosmosis has shown some promise as a possible technique, no effective implementation of a system using electroosmosis has yet been specifically proposed or demonstrated.

Because of the many possible advantages that electroosmosis techniques might bring to the problem of in situ contaminant removal at hazardous waste sites, it is desirable that an effective and reliable method and system be devised using such technique.

BRIEF SUMMARY OF THE INVENTION

In accordance with the invention, an electroosmosis system has been devised wherein at least one and, preferably, a plurality of porous anode electrode structures and at least one and, preferably, a plurality of porous cathode electrode structures are positioned at selected locations and at selected depths within a contaminated soil region. It should be understood that, although the contaminated soil region generally will be below ground level, it may also be soil which has been removed from below ground and has been piled at a suitable location on the surface of the ground. The electrode structures are designed, for example, so that they are in the form of channel structures, such as tubular channels extending from the surface to below the contaminated region, the portions of the electrode structures below the surface within the contaminated region being porous, or perforated. Depending on the polarity of the charge of the soil the electroosmotic flow can be either toward the anode electrode structures or the cathode electrode structures. In a positively charged soil, for example, electroosmotic flow will be toward the porous anode electrodes, whereas in a negatively charged soil the flow is toward the porous cathode electrodes. In the description below an electrode structure from which the flow emanates is called the "source electrode," and an electrode structure to which the flow migrates is called the "sink electrode."

A non-contaminating purging liquid, such as water, is supplied to the one or more source electrode structures so as to flow into the channel thereof and outwardly therefrom through the perforated portions thereof into the pores of the contaminated soil region. Voltage gradients are established between the source electrodes and sink electrodes by applying DC voltages thereto to create electric fields between source and sink electrodes. The contaminated liquid in the pores of the soil is displaced by, and, accordingly, moved through the pores by, the non-contaminating purging liquid which purging liquid is itself moved through the pores as a result of electroosmosis. In some cases, depending on the nature of the contaminated liquid in the pores, and in particular with aqueous solutions, in addition to being moved by the purging liquid, such contaminated liquid may also be moved through the pores directly by electroosmosis.

The contaminant liquid moving through the pores flows into the one or more sink electrodes through the perforations therein and can then be removed to the surface through the sink electrode channel structures using suitable pumping or syphoning action, for example. The contaminant can thereupon be suitably collected at the surface.

If the contaminant material contains species of opposite charge to that predominating in the double layer, as discussed below, said species may move toward the source electrodes and accumulate there. Such contaminant at the source electrodes may be removed by a pumping or syphoning action subsequent to the removal and collection of the contaminant from the sink electrodes.

Such a technique permits a substantially uniform removal of contaminant from the contaminated waste site region at a reasonable cost and provides an effective removal of a relatively highly concentrated solution of contaminant from the soil, the direction of flow of the contaminant being controlled by the placement of the electrodes in the region and the voltages applied to the electrodes.

By controlling the applied DC voltage levels, the number of electrode structures, and the depths and spacings of the electrode structures so as to control the directions and interactions of the voltage gradients produced between the electrode structures, the system can be operated in an effective manner, being particularly useful in waste sites having relatively low hydraulic permeabilities lying in a range of about $10^{-3}$ cm/sec. or less.

DESCRIPTION OF THE INVENTION

The invention can be described in more detail with the help of the accompanying drawings wherein FIG. 1 shows a diagrammatic view of a porous material useful in explaining the principles of electroosmosis;

Figure 1:
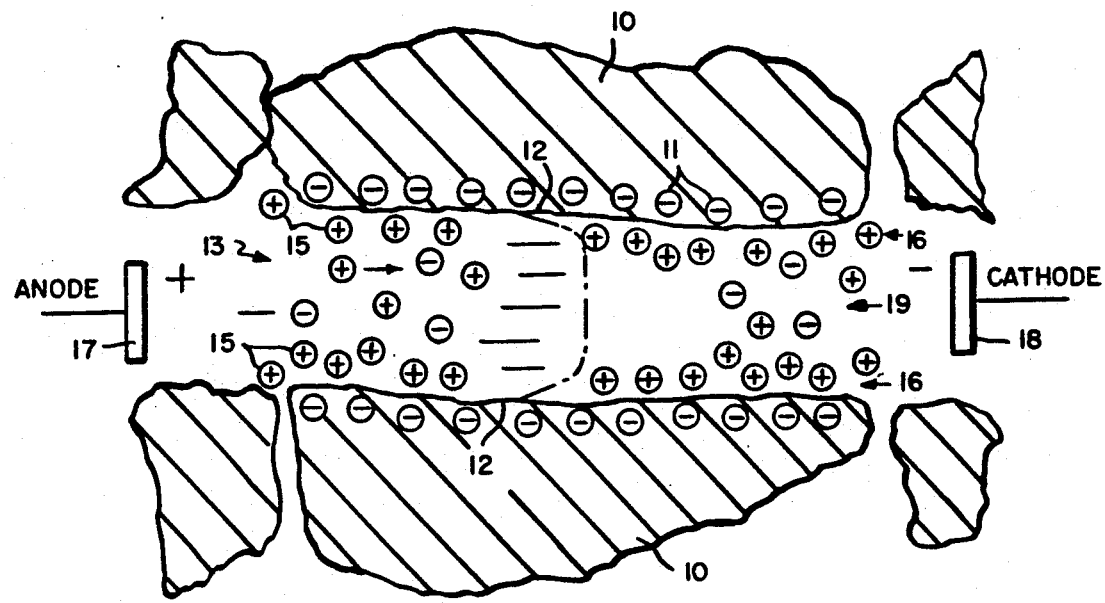

The principles of electroosmosis have long been known and it has long been demonstrated that, under the influence of an applied electric field, water can migrate through a porous clay diaphragm or region toward an electrode. Such phenomenon can be understood to be a consequence of the fact, as illustrated diagrammatically in the example of FIG. 1, that soil region 10, such as clay or sand, or soil containing mineral particles, typically carries charges, e.g., negative charges 11 at or near the surface 12 of a pore 13 therein when in contact with water, the water normally containing small quantities of dissociated salts. A negatively charged surface will attract positive ions 15 percent in the water and repel negative ions therein. The positive ions will, therefore, predominate in what is usually referred to as s "double layer" 16 next to the charged surface 12. The bulk of the water in the central region 19 of the pore generally has as many positive as negative ions and is essentially electrically neutral. An application of an external electric field along the pore, as established by a DC voltage across an anode (+) element 17 and a cathode (−) element 18, results in a net migration toward the cathode of positive ions in the double layer 16. Due to viscous drag, the bulk of the water in the region 19 of the pore is drawn by the motion of the positively charged double layer 16 and, therefore, also flows through the pore of the porous soil medium toward the cathode. The thickness of the double layer 16 is inversely proportional to the square root of the ionic charge concentration. Such thickness is typically very small, being about 10 nm for a univalent electrolyte with a concentration of 1 mol/m³, for example. Such a thickness is representative of what would be encountered in soil saturated with an aqueous solution.

It has been shown that, for such relatively thin double layers, for electroosmotic flow of a liquid through a pore whose internal surface is charged, where the resultant double layer is relatively thin compared to the radius of the pore (e.g. the pore radius may be one or two orders of magnitude greater than the double layer thickness), the uniform electroosmotic velocity $q_e$ is given by the following relation, sometimes referred to as the Helmholtz-Smoluchowski equation:

$$q_e = \frac{-\epsilon \rho E}{\mu} \qquad \text{Eq. (1)}$$

where $\epsilon$ is the permittivity of the flowing liquid, $\zeta$ is the zeta potential, i.e., the potential at the surface 12, E is the applied electric field, and $\mu$ is the viscosity of the liquid.

It can be further observed that in a circular capillary of radius a, which can be used as a good approximate model of a pore in soil, the hydraulic volume flow rate of a liquid therein is proportional to $a^4$ multiplied by the pressure gradient and is inversely proportional to the fluid viscosity. The electroosmotic flow rate is proportional to $q_e$ multiplied by the cross-sectional area $\pi a^2$. Therefore, the ratio of electroosmotic to hydraulic flow rate will be proportional to $1/a^2$. Thus, for example, if a capillary model is employed as a reasonably effective model for the pores of a porous soil, it can be seen that, as the average pore size decreases, electroosmostic flow will become important in driving the liquid through the soil medium compared with hydraulic flow. This is only valid provided the double layer is sufficiently thin, i.e., its thickness is very small compared to the pore radius, as mentioned above. Electroosmosis is, therefore, a process which can be particularly used to advantage in low permeability soil, e.g., densely packed clays and sandy soils of relatively low porosity, but which may become less effective for use with relatively high porosity soils, e.g., relatively loosely packed sandy soils.

In a porous material the superficial electroosmotic flow rate, or velocity, $q_E$ is given approximately by:

$$q_E = (n/t^2)q_e = -n/t^2(\epsilon\zeta E/\mu) \quad \text{Eq. (2)}$$

this relation being derived using a tortuous capillary model for the porous material in which n is the porosity of the porous material and t is the tortuosity of the porous material.

In a system in which the superficial electroosmotic flow ($q_E$) is combined with hydraulic flow ($q_H$) the total flow rate $q_T = q_E + q_H$. The superficial electroosmotic flow rate $q_E$ can be expressed as $$q_E = -K_E E \quad \text{Eq. (3)}$$

where $K_E$ is the coefficient of electroosmotic permeability (having units, for example, of cm$^2$/sec-V) and E is the electric field. From Eqs. (1) and (2)

$$K_E = (n/t^2)\epsilon\zeta/\mu \quad \text{Eq. (4)}$$

where the terms have been defined above. The hydraulic flow rate $q_H$ can be expressed as $$q_H = K_H \Delta H/L \quad \text{Eq. (5)}$$

where $\Delta H$ is the hydraulic head (in units of length), L is the distance between electrodes, and $K_H$ is the coefficient of hydraulic permeability (in units of velocity).

Figure 2:
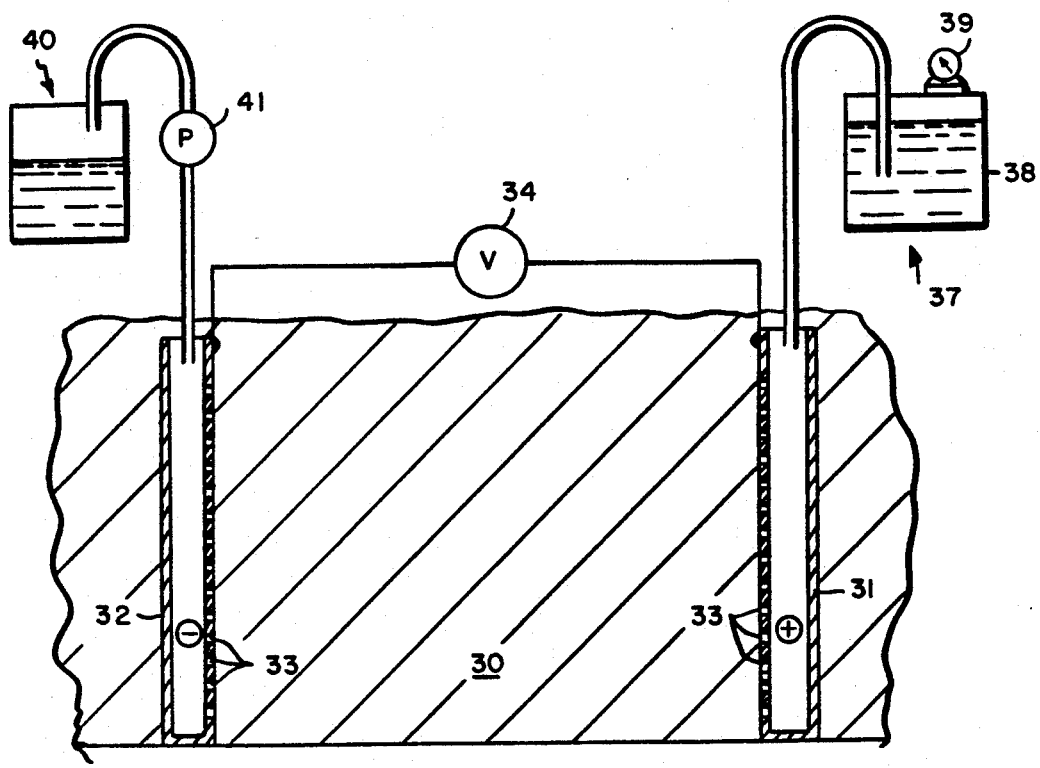
FIG. 2 shows a diagrammatic side view of an exemplary apparatus for demonstrating the operation of removing contaminants in accordance with the invention.

A system in accordance with the invention for removing contaminants from a soil medium is shown in FIG. 2. To aid in understanding the operation of a system of the invention the exemplary diagrammatic view therein shows a soil region 30 which contains a contaminant and has a pair of porous electrode structures mounted therein, one porous electrode structure 31 being an anode (+) electrode and the other porous electrode structure 32 being a cathode (−) electrode. In the exemplary embodiment shown, each electrode structure has perforations 33 in the portion thereof in the soil region from which the contaminant is to be removed. Such porous electrode structure configuration, wherein the electrode acts as the channel itself, is exemplary only. Alternatively, for example, the electrode structures may be in the form of perforated casings with a separate electrode material mounted internal to the casing. Moreover, the perforations may extend around the entire periphery of the structure. Many other suitable configurations are also possible and will occur to those in the art for performing the desired functions.

The electrodes are connected to a DC voltage source 34. A source 37 of a harmless, non-toxic purging liquid 38 supplies such liquid to the anode electrode structure 31 from where it flows outwardly from the perforations 33 into the soil medium. Purging solution 38 can be supplied under pressure which can be suitably regulated by a pressure regulator 39, in a manner which would be well within the skill of those in the art.

The electric field created across electrode structures 31 and 32 produces an electroosmotic force, as described above, which causes the purging liquid 38 to move within the soil medium toward the sink electrode (in this case the cathode) 32. If the contaminant is in solution it will also be driven toward the sink electrode 32 by electroosmosis, its movement being assisted by the movement of purging solution 38, the latter solution in effect displacing the contaminant solution within the soil medium as it moves toward sink electrode 32. The contaminant flows into the sink electrode 32 via the perforations 33 thereof and can be pumped via pump 41, or siphoned, to an effluent collector 40 at a location remote from the soil medium, e.g., at the surface of the earth in the case where the waste site is located below such surface.

Figure 3:
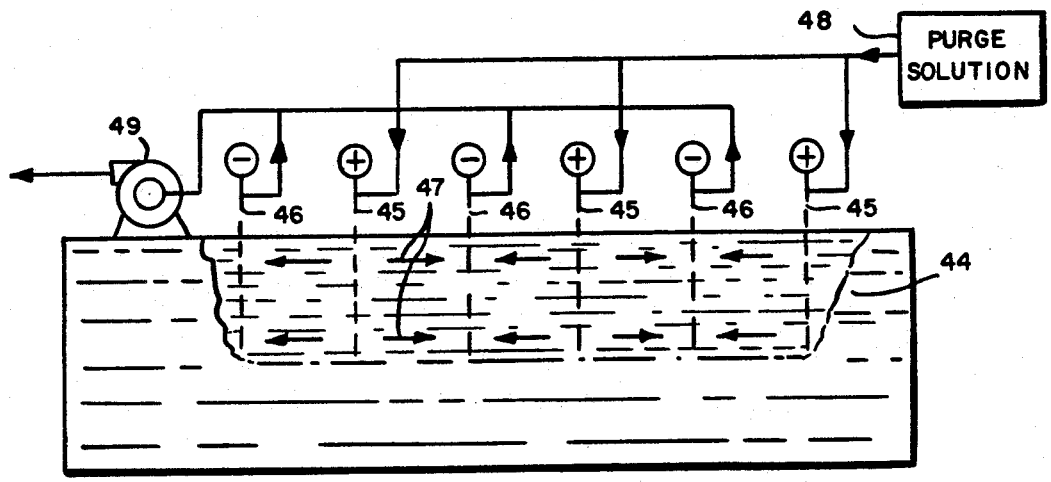
FIG. 3 shows a diagrammatic side view of a further exemplary embodiment of the invention in a waste site.

FIG. 3 depicts a diagrammatic side view of an exemplary system in accordance with the invention as installed in a hazardous waste site 44. The exemplary placement of anode and cathode electrode structures 45 and 46 respectively, is chosen to move the pore liquid in the desired direction between pairs thereof as shown by arrows 47. Purging solution from a source 48 thereof is fed into the source electrodes (in this case the anodes) and contaminant solution is removed from the sink electrodes (in this case the cathodes) using a pump 49. The purging solution can be introduced to the source electrodes at an elevated pressure to assist the flow of liquid through the soil.

Figure 4:
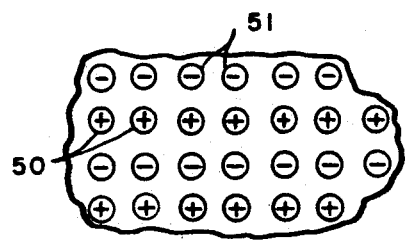
FIGS. 4 and 4A show diagrammatic plan views of two exemplary embodiments of the invention illustrating possible electrode emplacement configurations in a waste site.
Figure 4A:
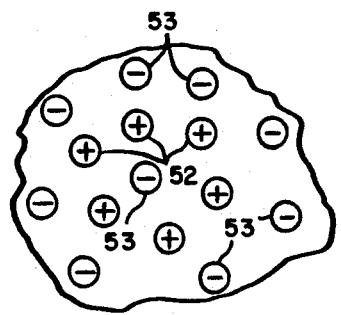

FIGS. 4 and 4A depict simplified plan views of exemplary installations demonstrating two possible anode (+)/ cathode (−) configurations. In FIG. 4, for example, source and sink electrodes 50 and 51, respectively, are generally arranged in pairs in relatively regularly spaced rows and columns, while in FIG. 4A the source and sink electrodes 52 and 53, respectively, are arranged in generally concentric circles about a substantially centralized point within the site. Any specific electrode configuration, i.e., the number and locations thereof, will depend on, for example, soil properties, contaminant distribution, and site configuration. Thus, for typical waste sites, a plurality of anodes and cathodes of the type discussed above, and shown diagrammatically only in FIGS. 4 and 4A, should be appropriately spaced throughout the site at suitably selected depths therein so as to cause effective movement of the purging solution and contaminant from the source electrodes to the sink electrodes substantially throughout the site in the manner described above. The contaminant obtained from each sink electrode can be separately collected from each or can be commonly collected from all or selected groups thereof at the surface, as desired.

Figure 5:
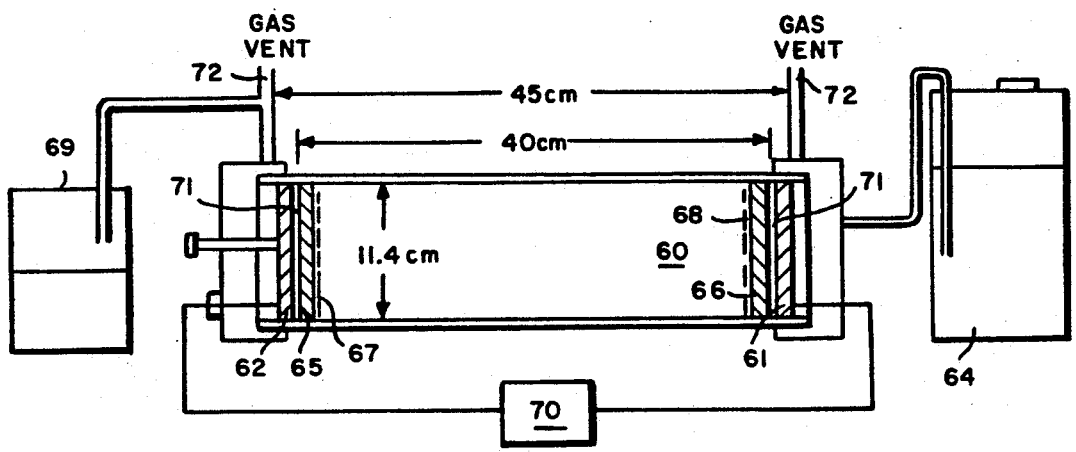
FIG. 5 shows a schematic diagram of a laboratory scale apparatus for demonstrating the operation of the invention.

The operation of the system of the invention such as disclosed in FIG. 2 has been demonstrated by experimental tests which have shown that effective removal of contaminants from a soil sample can be achieved. A schematic diagram of an experimental apparatus for demonstrating the principles of operation of the invention is shown in FIG. 5. For example, a tubular container 63 has a compacted Kaolin clay sample 60 containing acetic acid as a contaminant therein. The contaminant is a 0.5M acetic acid solution (where water is the solvent), the purging liquid from a source 64 is a salt solution, e.g., a 0.1M NaCl solution (where water is the solvent), and an electric potential of 25 volts (from voltage source 70) is established with a spacing of 40 cm between source electrode 61 and sink electrode 62. Passive sensing electrodes 65 and 66, which are used for measuring the electric potential at the clay, and filter paper 67 and 68 are used adjacent to the active electrodes 62 and 61, respectively, separated therefrom by suitable plexiglass spacers 71. The channels of each electrode structure are suitably vented to air via gas vents 72.

Figure 6:
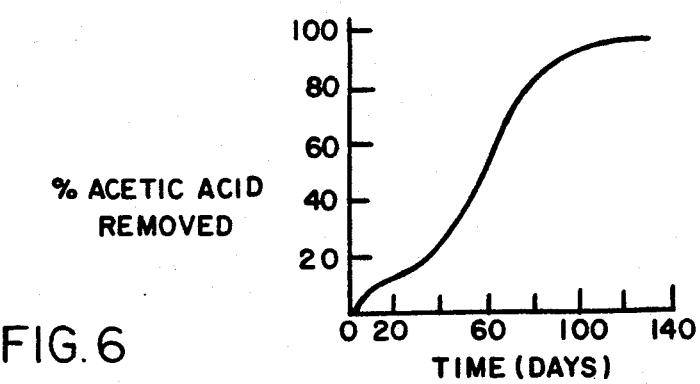
FIGS. 6–9 show graphs illustrating the results of using an apparatus of the type shown in FIG. 5 for removing certain contaminant materials from soil samples.
Figure 7:
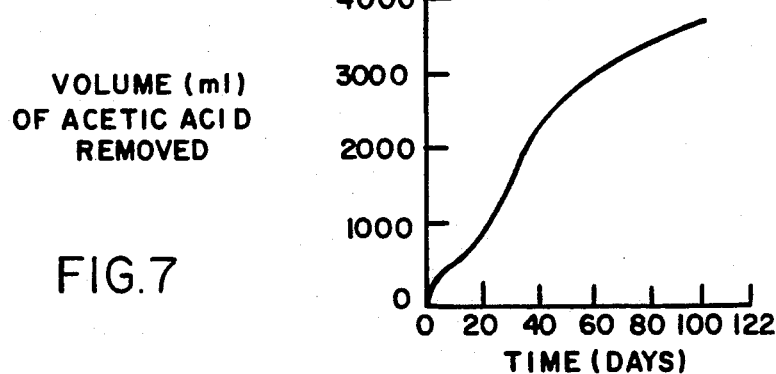

The tubular container 63 has an internal diameter of about 11.4 cm. and a length of about 45 cm. The percentage of acetic acid removed from the soil sample as a function of time and collected at collector 69 is shown in the graph of FIG. 6. Over about a 100–120 day time period almost all of the acetic acid contaminant was removed. A graph of the absolute volume (in milliliters) removed over a time period of about 100 days is shown in FIG. 7.

Figure 8:
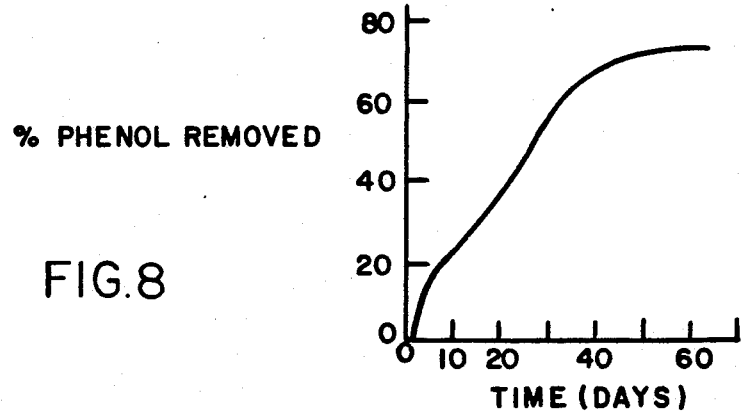
Figure 9:
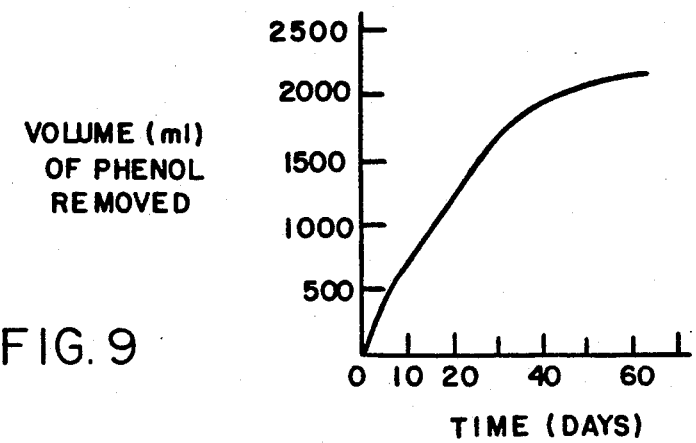

Similar results as shown in the graphs of FIGS. 8 and 9 of a phenol contaminant of 45 ppm aqueous solution in the soil sample, FIG. 8 depicting the percentage of phenol removal over a 60 day time period and FIG. 9 depicting the absolute volume in milliliters removed over the same time period using a purge solution of plain tap water.

In accordance with the invention, for most practical applications, the applied voltage preferably lies within a range from about 20–200 volts (V), although in some applications even higher voltages can be used. The spacings between anodes and cathodes preferably lie within a range from about 1–5 meters (m) providing a range of average voltage gradients from about 20–200 V/m. The electrode depth will generally lie within a range from about 3–15 m, $K_E$ will be in a range from about $10^{-9}$ to $10^{-8}$ m$^2$/V-sec, while $K_H$ will be in a range from about $10^{-8}$ to $10^{-4}$ cm/sec. Soil conductivities will tend to lie within a range from about $10^{-3}$ to about $10^{-2} \Omega^{-1} m^{-1}$. The electroosmotic volume flow rate $q_E$ will be within a range from about $10^{-7}$ to $10^{-6}$ m$^3$/sec/m$^2$. The current density in the electric field will be from about 0.01 to 5.0 A/m$^2$. Such ranges are not to be considered as necessarily limiting, but represent practical ranges which will prove useful in many, if not most, applications.

Use of the technique of the invention can provide in situ removal of contaminants at a reasonable cost in a manner which can assure effective removal uniformly over a relatively large volume of soil in a controlled manner, i.e. where the direction of flow can be controlled so as not to be diffused to regions outside the contaminated site. It can also provide removal of contaminants from soils situated on the earth's surface. The technique is particularly useful in tightly packed soils, such as clays or other soil regions having very low hydraulic permeabilities, and would be particularly useful in removing waste contaminants where hydraulic techniques are especially ineffective. Moreover, the use of a harmless, non-toxic purging solution, such as water, maintains a liquid saturation of the site and prevents dewatering or soil consolidation at the site which may give rise to complications, e.g., collapse of the site, due to the drying out of the soil.

While the exemplary embodiments depicted above show the electrode structures as being generally positioned vertically in the soil site in which they are located, i.e., substantially perpendicular to the surface thereof, such structures can also be positoned at other orientations, e.g., at selected angles relative to the surface of the soil site and even horizontally, i.e., substantially parallel thereto, as desired for the particular soil site in which they are used. Other modifications to the specific embodiments described above will occur to those in the art within the spirit and scope of the invention. Hence, the invention is not to be construed as limited to the particular embodiments disclosed herein, except as defined by the appended claims.

What is claimed is:

1. A method for removing a material from a soil site comprising the steps of
    positioning one or more source electrodes at one or more first locations within said soil site;
    positioning one or more sink electrodes at one or more second locations within said soil site;
    establishing one or more voltage gradients among said source electrodes and said sink electrodes;
    supplying a purging liquid from a source thereof external to said soil site to said one or more source electrodes, said purging liquid containing substantially little or none of said material to be removed, said source electrodes being arranged to permit said purging liquid to flow from said source electrodes into said soil site, the one or more voltage gradients causing said purging liquid to move by electroosmosis through said soil site toward said one or more sink electrodes and to displace said material so as to cause the displaced material to be moved from said soil site into said one or more sink electrodes; and
    removing said material from said one or more sink electrodes.

2. A method in accordance with claim 1 wherein said material is a contaminant material and said purging liquid is a non-toxic, aqueous solution.

3. A method in accordance with claim 1 wherein said purging liquid is supplied to said one or more source electrodes under pressure.

4. A method in accordance with claim 1 wherein said contaminant material is removed from one or more said sink electrodes by pumping or siphoning action.

5. A method in accordance with claim 1 wherein the number and locations of a plurality of said source electrodes and a plurality of said sink electrodes in said soil site are determined by the properties and configuration of said soil site and by the distribution of said material in said soil site and further including the step of collecting the material removed from each said one or more sink electrodes.

6. A method in accordance with claim 1 wherein the one or more voltage gradients are at least about 20 volts/meter, or greater.

7. A method in accordance with claim 6 wherein the one or more voltage gradients lie with a range from about 20–200 volts/meter.

8. A method in accordance with claim 1 wherein the source and sink electrodes are located in said soil site at depths which lie within a range from about 3–15 meters from the surface of the soil site.

9. A method in accordance with claim 1 wherein the source and sink electrodes located in said soil site are spaced from each other at distances lying within a range from about 1–5 meters.

10. A method in accordance with claim 1 wherein in a negatively charged soil site said source electrodes are anode electrodes and said sink electrodes are cathode electrodes.

11. A method in accordance with claim 1 wherein in a positively charged soil site said source electrodes are cathode electrode channels and said sink electrodes are anode electrodes.

12. A method in accordance with claim 1 wherein the material removed from said soil site has a specified charge polarity which assists in moving said material toward said one or more sink electrodes.

13. A method in accordance with claim 12 where said soil site contains further material having a charge polarity opposite to said specified charge polarity which may cause said further material to move toward said source electrodes and further including the steps of removing said further material from said source electrodes.

14. A method in accordance with claim 1 wherein said material is a contaminant material in said soil site.

* * * * *